(12) United States Patent
Cochet et al.

(10) Patent No.: US 7,805,937 B2
(45) Date of Patent: Oct. 5, 2010

(54) INTERNAL COMBUSTION ENGINE WITH POWER BOOST IN RESPONSE TO IMPENDING LOAD

(75) Inventors: Stephane Cochet, Saint Jean de Braye (FR); Adam Wolf, Cedar Falls, IA (US); Brian Eugene Holthaus, Waterloo, IA (US); James Hugh Ross, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 151 days.

(21) Appl. No.: 11/507,345

(22) Filed: Aug. 21, 2006

(65) Prior Publication Data
US 2007/0044471 A1 Mar. 1, 2007

(30) Foreign Application Priority Data
Aug. 25, 2005 (WO) .................. PCT/US2005/30635

(51) Int. Cl.
*F02D 23/00* (2006.01)
(52) U.S. Cl. .................. 60/602; 60/605.2; 123/564
(58) Field of Classification Search .................. 60/602, 60/605.2, 611; 123/564
See application file for complete search history.

(56) References Cited

U.S. PATENT DOCUMENTS

| 4,522,553 | A | | 6/1985 | Nelson et al. ................ 414/526 |
|---|---|---|---|---|
| 5,454,767 | A | * | 10/1995 | Clausen et al. ................ 477/32 |
| 5,715,790 | A | | 2/1998 | Tolley et al. ................ 123/396 |
| 5,878,557 | A | * | 3/1999 | Wyffels et al. ................ 56/13.5 |
| 5,890,468 | A | * | 4/1999 | Ozawa ........................ 123/561 |
| 6,138,782 | A | | 10/2000 | Anderson et al. .......... 180/6.44 |
| 6,155,049 | A | | 12/2000 | Bischoff ...................... 60/602 |
| 6,199,006 | B1 | | 3/2001 | Weiss et al. ................. 701/102 |
| 6,279,551 | B1 | | 8/2001 | Iwano et al. ................. 123/564 |
| 6,347,272 | B2 | | 2/2002 | Flammersfeld et al. ....... 701/93 |
| 6,589,136 | B2 | | 7/2003 | Ephraim et al. ............. 477/111 |
| 7,295,914 | B2 | * | 11/2007 | Schmid ....................... 701/104 |

* cited by examiner

*Primary Examiner*—Hoang M Nguyen

(57) ABSTRACT

An internal combustion engine is associated with a remote load indicator which provides an output signal, corresponding to an impending increase in mechanical load. The internal combustion engine includes an air supply system and an electrical processing circuit. The electrical processing circuit is coupled with the load indicator and receives the output signal. The electrical processing circuit controls the air supply system to initiate an increase in an air supply to the internal combustion engine prior to the increase in mechanical load.

26 Claims, 3 Drawing Sheets

INTERNAL COMBUSTION ENGINE WITH POWER BOOST IN RESPONSE TO IMPENDING LOAD

This application claims the benefit of prior-filed copending international patent application Serial No. US 2005/030,635 designating the United States of America, filed on 25 Aug. 2005, and entitled "System and Method of Controlling the Transient Response of a Turbocharged Engine," which is hereby incorporated by reference.

FIELD OF THE INVENTION

The present invention relates to internal combustion engines, and, more particularly, to control techniques for controlling transient load responses of such engines.

BACKGROUND OF THE INVENTION

The step load response of an internal combustion (IC) engine in transient after a load impact is a feature mostly influenced by the engine displacement, the hardware of the engine (e.g., whether it has a standard turbocharger, a turbocharger with waste gate or variable geometry, etc.), and by the software strategy for driving the air and fuel actuators (e.g., exhaust gas recirculation, turbocharger with variable geometry turbine (VGT), fuel injector configuration, etc.) with respect to the requirements of emissions legislation (e.g., visible smoke, NOx, etc.), noise or vibrations.

Engine systems as a whole react in a linear manner during transients. Referring to FIG. 1, a load is initially applied to the drive shaft of the IC engine. The IC engine speed decreases when the load increases. The engine speed drop is influenced by whether the governor is isochronous or has a speed droop. The air flow is increased through governor response to provide additional air to the IC engine. A time delay is necessary to achieve the new air flow set point. The fuel injection quantity, which is nearly immediate, is increased with respect to both the smoke limit and maximum allowable fuel quantity. The engine then recovers to the engine speed set point. The parameters associated with an engine step load response in transient after a load impact are the speed drop and the time to recover to the engine set point (note that in FIG. 1, the two curves for turbo speed and desired fuel are labeled on the left vertical axis, and the two curves for engine speed and reference speed are labeled on the right vertical axis).

What is needed in the art is an internal combustion engine and corresponding control technique for boosting power immediately prior to an impending transient load on the engine.

SUMMARY OF THE INVENTION

The present invention provides an IC engine with an ECM which receives a signal from a load detector and increases an air supply to the IC engine prior to the IC engine actually experiencing the load.

The invention comprises, in one form thereof, an internal combustion engine associated with a remote load indicator. The load indicator provides an output signal corresponding to an impending increase in mechanical load. The internal combustion engine includes an air supply system and an electrical processing circuit. The electrical processing circuit is coupled with the load indicator and receives the output signal. The electrical processing circuit controls the air supply system to initiate an increase in an air supply to the internal combustion engine prior to the increase in mechanical load.

An advantage of the present invention is that power boost to the IC engine can be effected prior to a load actually affecting operation of the IC engine.

Another advantage is that it is not necessary to experience a change in the performance of the IC engine prior to changing an operating characteristic of the IC engine (such as air or fuel flow).

Yet another advantage is that the impending load can be detected directly using an output signal from a load actuator (e.g., switch actuator), or indirectly from a sensor associated with a load actuator (e.g., a sensor detecting a position of a hydraulic lever).

A further advantage is a decrease in engine speed drop and recovery time in response to a load impact.

A still further advantage is that the power boost compensation allows for a reduction in engine displacement sizing, thereby decreasing the cost of the engine.

Another advantage is that fuel consumption is reduced as a result of the reduction in engine displacement sizing.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
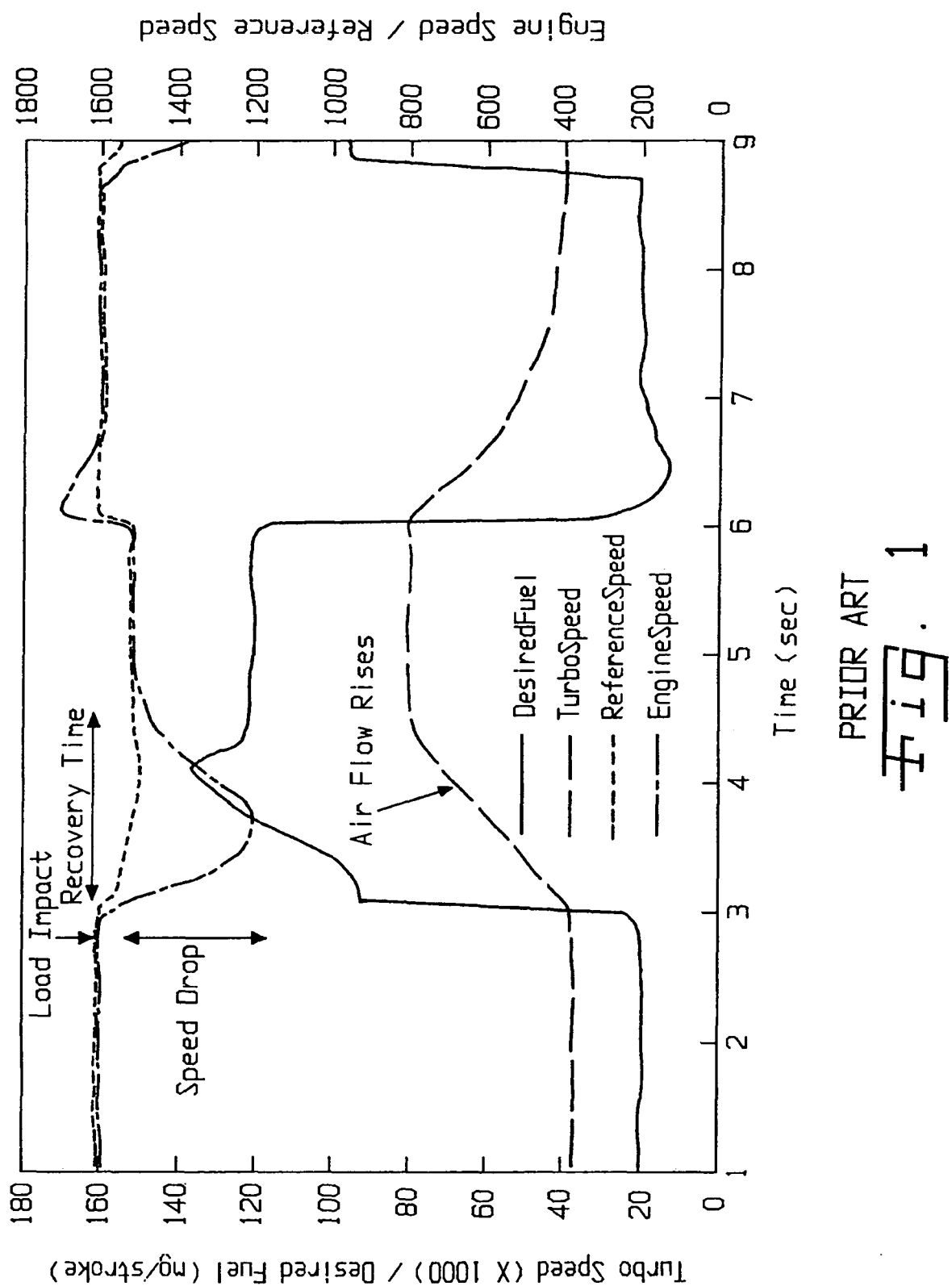
FIG. 1 is a schematic illustration of a step load response of an IC engine after a load impact.
Figure 2:
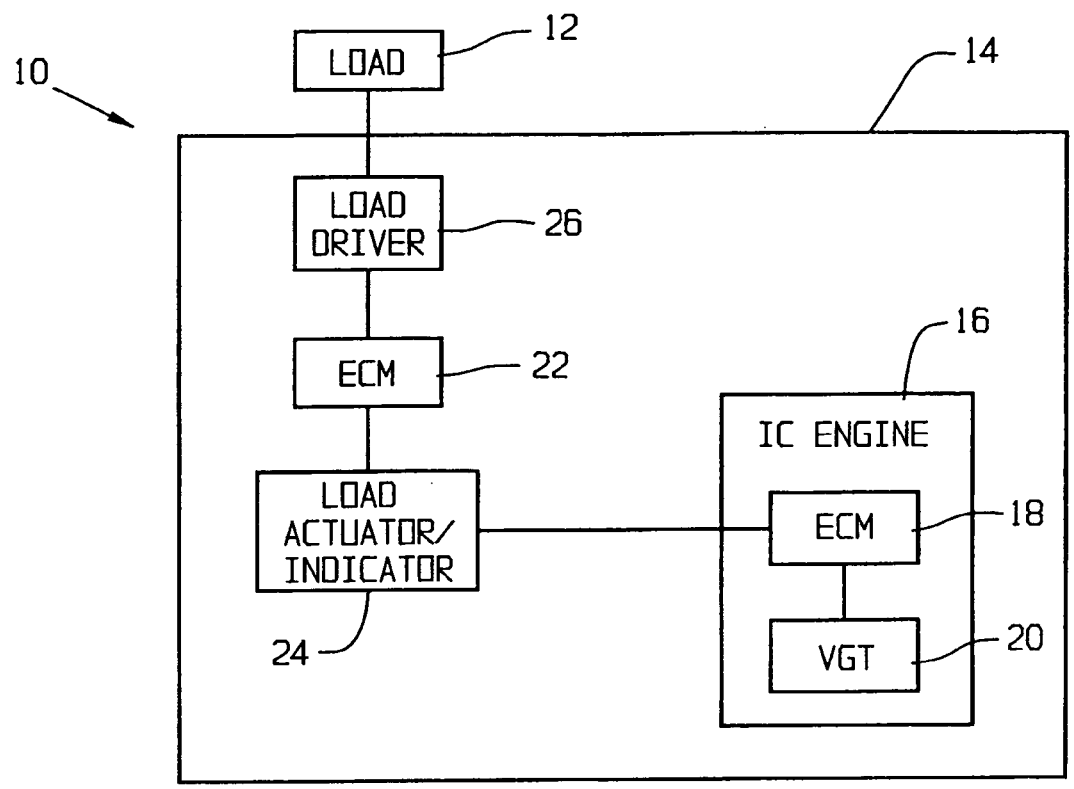
FIG. 2 is a schematic illustration of an embodiment of a system for driving a mechanical load of the present invention.
Figure 3:
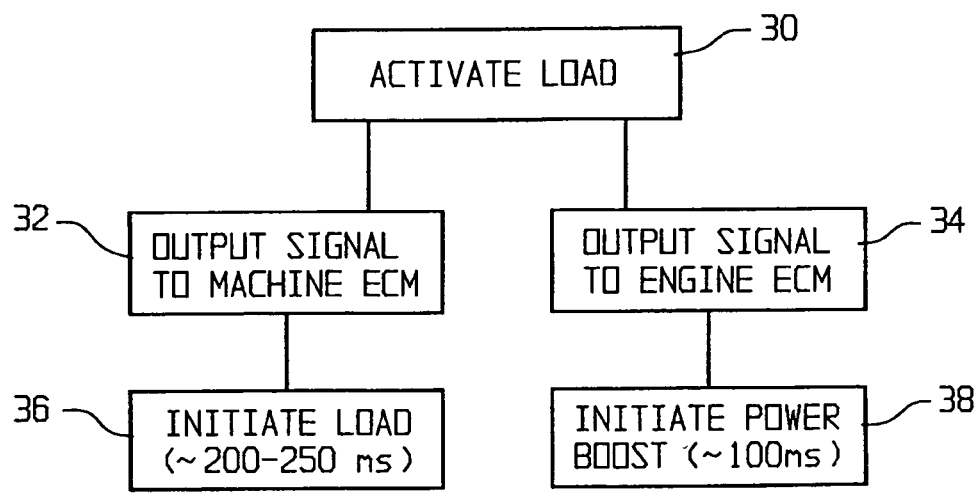
FIG. 3 is a flow chart illustrating an embodiment of a control algorithm used with the system of FIG. 2.

Referring now to the drawings, and more particularly to FIG. 2 there is shown an embodiment of a system 10 of the present invention for driving a mechanical load 12. In the embodiment shown, system 10 is in the form of a vehicle 14 including an IC engine 16. In one embodiment, vehicle 14 may be in the form of a traction unit such as an agricultural tractor, but may also be configured as another type of off-road vehicle or an on-road vehicle. Alternatively, IC engine 16 may be included as part of a stationary power set, such as a stationary generator set.

IC engine 16 may be of any suitable configuration, such as a diesel engine, gasoline engine, propane engine, etc. IC engine 16 includes an electrical processing circuit, such as an electronic control module (ECM) 18. ECM 18, in known manner, may control various functions of IC engine 16, such as fuel injection and the position of one or more vanes in a VGT 20 of a turbocharger.

Vehicle 14 includes a separate ECM 22 for monitoring, controlling and/or regulating other functions external to IC engine 16, but internal to vehicle 14. For example, ECM 22 may be electrically coupled with load actuator/indicator 24 for receiving an input signal when a user desires to actuate an external load. ECM 22 in turn provides an output signal to a load driver 26 for driving an external load 12. In one embodiment, load actuator/indicator 24 is in the form of an electric switch, and load driver 26 is in the form of a hydraulic motor used to drive external load 12. Load 12 may be configured in a suitable manner, dependent upon the particular application, such as a hydraulically driven timber saw or grapple hooks, etc.

In another embodiment, load actuator/indicator 24 may be configured as a mechanical lever which engages a load driver, such as a power take-off (PTO) shaft at the rear of an agricultural tractor. The load actuator/indicator 24 may be a mechanically actuated PTO lever, and the indicator portion may be in the form of a separate or integral sensor which detects a position of the PTO lever. Such position sensors may include proximity switches, optical sensors, inductive sensors, single pole pushbutton switches, etc.

As yet a further example, load 12 may be in the form of a traction load such as occurs when a chisel or moldboard plow is dropped into soil. Load actuator/indicator 24 can include a hydraulic lever within a cab of an agricultural tractor, and a sensor associated with the hydraulic lever for detecting a position of the hydraulic lever indicating that an agricultural implement is being dropped into the soil.

As a still further example, IC engine 16 may be part of a stationary generator set and load 12 may be in the form of an electrical load which is actuated by throwing an electrical breaker. The position of the breaker can be used to determine an impending electrical load affecting operation of IC engine 16.

The operation of system 10 shown in FIG. 2 will now be described in further detail. For illustration, vehicle 14 is assumed to be a forestry machine and load 12 is a forestry saw. When an operator desires to use saw 12, an electric switch is depressed which defines load actuator/indicator 24 (FIG. 2, block 30). Electric switch 24 sends an output signal to ECM 22 on board vehicle 14 (block 32), and also sends an output signal to ECM 18 forming part of IC engine 16 (block 34). ECM 22 of vehicle 14 actuates a motor, such as a hydraulic motor 26 which drives forestry saw 12 (block 36). The time delay for actuating forestry saw 12 is approximately 200-250 milliseconds. Concurrently, upon receipt of the output signal from electric switch 24, ECM 18 of IC engine 16 changes the position of one or more vanes within VGT 20 to provide an increased air supply to IC engine 16 (block 38). The time delay for moving the vanes within VGT 20 and starting the power boost is approximately 100 milliseconds. The increased air supply results in a power boost to IC engine 16 prior to actually experiencing the increased load through saw 12. It is also possible for ECM 18 to increase the fuel supply to IC engine 16, such as by using an appropriate fuel injection technique.

Figure 4:
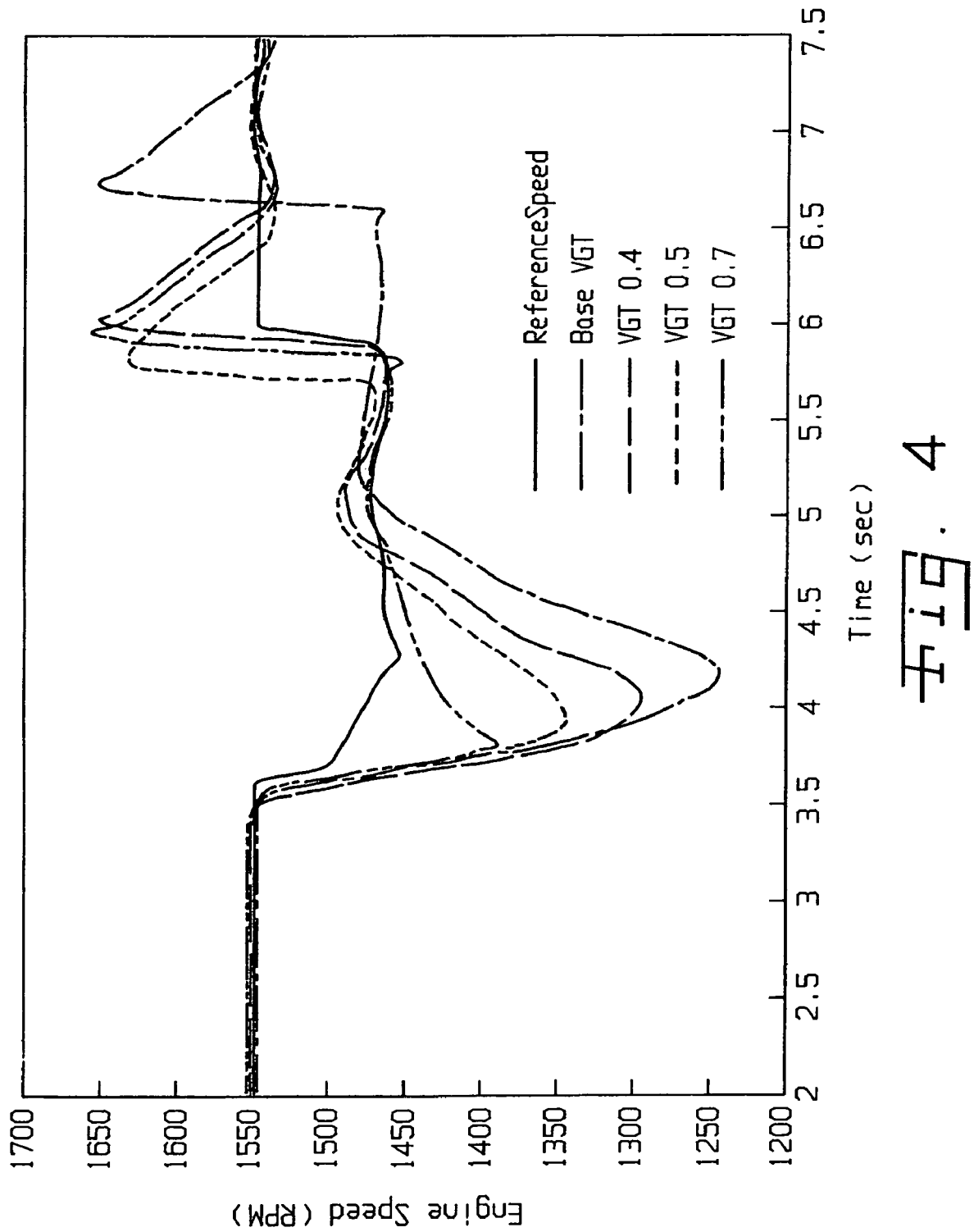
FIG. 4 is a graphical illustration of engine speed drop and time to recover using the system shown in FIG. 2.

Referring now to FIG. 4, the effect of initiating a power boost prior to the affect of an external load being applied to IC engine 16 can be observed. The time delay for initiating the power boost is shortened, and the engine speed drop resulting from the external load is lessened.

In the embodiment shown, load actuator/indicator 24 is external to IC engine 16 and internal to vehicle 14. However, it will also be appreciated that load actuator/indicator may be made as an integral part of IC engine 16, such as an electric switch on a generator set.

Additionally, system 10 is shown as including an ECM 18 integral with IC engine 16, and a separate ECM 22 integral with vehicle 14. It will be appreciated that ECM 18 and ECM 22 may be incorporated into a single control module, dependent upon the particular application. Additionally, ECM 18 and/or 22 may be a digital and/or analog processing circuit, depending upon the particular application.

Moreover, load 12 is shown as being external to vehicle 14, but may also be included integral with vehicle 14. For example, load 12 could consist of a front wheel assist arrangement on an agricultural tractor which is actuated with an electrical switch.

Further, in the embodiment shown, ECM 18 controls the air supply system of IC engine 16 by changing the position of one or more vanes within VGT 20 to provide an increased air supply to IC engine 16. However, it is also possible for ECM 18 to control other physical components of an air supply system of IC engine 16. For example, IC engine 16 may include an air supply system with other controllable components related to a variable geometry turbocharger, exhaust gas recirculation system, turbocharger wastegate system, etc.

Having described the preferred embodiment, it will become apparent that various modifications can be made without departing from the scope of the invention as defined in the accompanying claims.

The invention claimed is:

1. A system for driving a mechanical load, comprising:
    a mechanical load;
    a control system for actuating said mechanical load;
    a load indicator interconnected with said mechanical load control system for providing an output signal corresponding to an impending increase in mechanical load; and
    an internal combustion engine including an air supply system and an electrical processing circuit, said electrical processing circuit coupled with said load indicator and receiving said output signal, said electrical processing circuit controlling said air supply system in response to the signal from said load indicator to substantially simultaneously initiate an increase in an air supply to said internal combustion engine, said increased air supply occurring prior to said mechanical load affecting operation of said internal combustion engine.

2. The system for driving a mechanical load of claim 1, wherein said mechanical load comprises at least one of a traction load, a power take-off load, and a hydraulic load.

3. The system for driving a mechanical load of claim 1, wherein said increase in said air supply to said internal combustion engine includes a change in a position of at least one vane in a variable geometry turbine of a turbocharger.

4. The system for driving a mechanical load of claim 1, wherein said air supply system includes a controllable physical component.

5. The system for driving a mechanical load of claim 1, wherein said air supply system includes at least one of:
    a variable geometry turbocharger;
    an exhaust gas recirculation system; and
    a turbocharger wastegate system.

6. The system for driving a mechanical load of claim 1, wherein said load indicator includes one of a load actuator and a load sensor.

7. The system for driving a mechanical load of claim 6, wherein said load indicator includes one of a load actuating switch and a load actuating lever.

8. The system for driving a mechanical load of claim 7, wherein said switch comprises an electric switch.

9. The system for driving a mechanical load of claim 7, wherein said load indicator comprises a switch effecting a sawing operation.

10. The system for driving a mechanical load of claim 1, wherein said electrical processing circuit comprises an electronic control module.

11. The system for driving a mechanical load of claim 1, wherein said electronic control module is electrically coupled with said load indicator.

12. The system for driving a mechanical load of claim 1, further including a frame carrying said internal combustion engine, said frame forming of one of a vehicle and a stationary power set.

13. The system for driving a mechanical load of claim 1, wherein said electrical processing circuit initiates said change in said operating characteristic approximately immediately upon receipt of said output signal.

14. An internal combustion engine associated with a load actuator configured for actuating an external load independent of the control of said internal combustion engine, said internal combustion engine comprising:

an air supply system; and an electrical processing circuit coupled with said air supply system and couplable with said load actuator, said electrical processing circuit controlling said air supply system in response to the signal from said load indicator to substantially simultaneously initiate an increase in an air supply to said internal combustion engine upon actuation of said load actuator, said increased air supply occurring prior to said mechanical load affecting operation of said internal combustion engine.

15. The internal combustion engine of claim 14, wherein said increase in said air supply to said internal combustion engine includes a change in a position of at least one vane in a variable geometry turbine of a turbocharger.

16. The internal combustion engine of claim 14, wherein said air supply system includes a controllable physical component.

17. The internal combustion engine of claim 14, wherein said air supply system includes at least one of:

a variable geometry turbocharger;

an exhaust gas recirculation system; and a turbocharger wastegate system.

18. The internal combustion engine of claim 14, wherein said electrical processing circuit comprises an electronic control module.

19. The internal combustion engine of claim 14, wherein said electronic control module is electrically couplable with the load indicator.

20. The internal combustion engine of claim 14, further including a frame carrying said internal combustion engine, said frame forming part of one of a vehicle and a stationary power set.

21. A method of operating an internal combustion engine, comprising the steps of:

controlling a mechanical load independent of said internal combustion engine;

outputting an output signal from a load indicator responsive to the control of said mechanical load to an electrical processing circuit, said output signal indicating an impending increase in mechanical load; and substantially simultaneously controlling an air supply system using said electrical processing circuit, dependent upon said output signal, to increase an air supply to said internal combustion engine prior to said mechanical load affecting operation of said internal combustion engine.

22. The method of operating an internal combustion engine of claim 21, including the step of actuating a load actuator, said output signal being outputted upon occurrence of said actuating step.

23. The method of operating an internal combustion engine of claim 21, wherein said load indicator includes one of a load actuator and a load sensor.

24. The method of operating an internal combustion engine of claim 23, wherein said load indicator includes one of a load actuating switch and a load actuating lever.

25. The method of operating an internal combustion engine of claim 24, wherein said load indicator comprises a switch effecting a sawing operation.

26. The method of operating an internal combustion engine of claim 21, wherein said electrical processing circuit comprises an electronic control module.

\* \* \* \* \*